No. 755,231. PATENTED MAR. 22, 1904.
H. A. LANMAN.
FIFTH WHEEL CONSTRUCTION.
APPLICATION FILED NOV. 27, 1903.
NO MODEL.
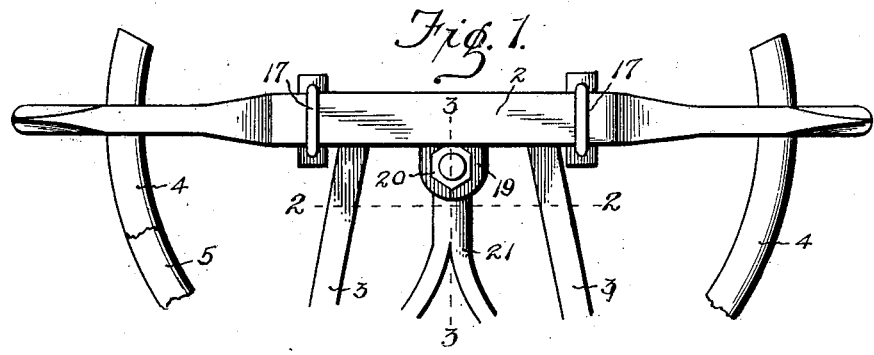
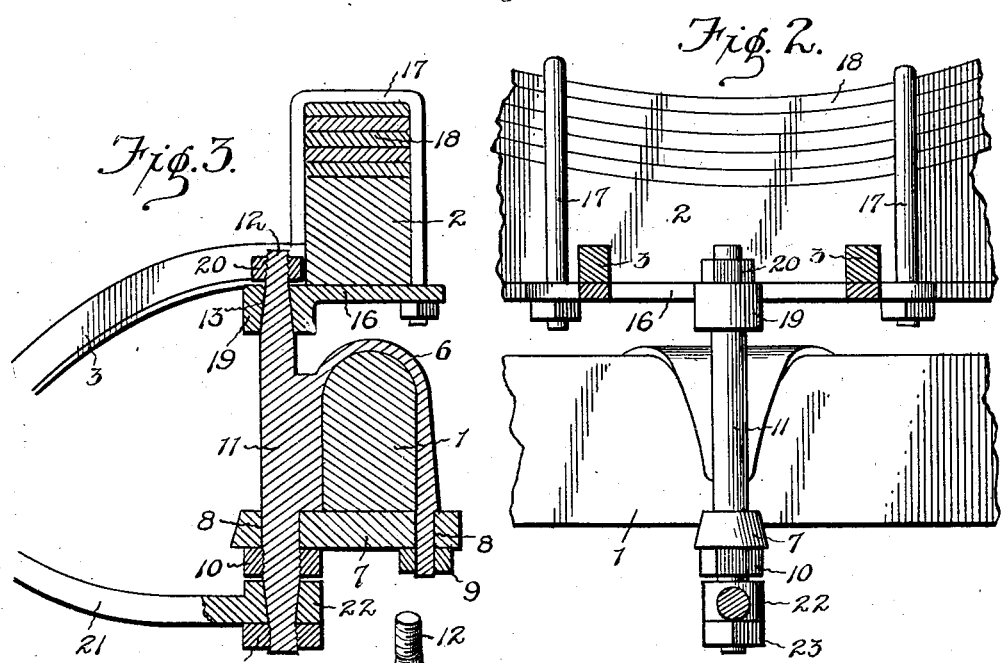
Witnesses
Ralph A. Shepard
Henry A. Lanman, Inventor
by Shepherd & Parker
Attorneys No. 755,231.

Patented March 22, 1904.

UNITED STATES PATENT OFFICE.

HENRY A. LANMAN, OF COLUMBUS, OHIO.

FIFTH-WHEEL CONSTRUCTION.

SPECIFICATION forming part of Letters Patent No. 755,231, dated March 22, 1904.

Application filed November 27, 1903. Serial No. 182,851. (No model.)

*To all whom it may concern:*

Be it known that I, HENRY A. LANMAN, a citizen of the United States, residing at Columbus, in the county of Franklin and State of Ohio, have invented a certain new and useful Improvement in Fifth-Wheel Construction, of which the following is a specification.

This invention relates to fifth-wheels for vehicles, and has for its object to provide an improved king-bolt clip which is complete in itself and may be applied in connection with any common or preferred form of fifth-wheel bearing members without requiring any alteration in the same or the running-gear of the vehicle.

With this object in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a plan view of a fifth-wheel construction embodying the features of the present invention. Fig. 2 is a cross-section on the line 2 2 of Fig. 1. Fig. 3 is a sectional view on the line 3 3 of Fig. 1. Fig. 4 is a detail perspective view of the king-bolt clip. Fig. 5 is a detail view of the bolster-plate.

Like characters of reference designate corresponding parts in each and every figure of the drawings.

For an adequate understanding of the application and operation of the present invention I have shown certain old and well-known parts of a running-gear, including an axle 1, a bolster 2, reaches 3, and upper and lower fifth-wheel bearing members 4 and 5, respectively, the lower of which members is connected to the axle in any suitable manner and the upper member connected to the under side of the bolster and the upper sides of the reaches.

In carrying out the present invention I employ a king-bolt clip 6, which is of inverted substantially U shape, so as to embrace the axle in the manner of any ordinary axle-clip, and is located substantially concentric with respect to the fifth-wheel members. An ordinary tie-plate 7 is applied to the under side of the axle and has terminal openings 8 for the reception of the lower end portions of the sides of the clip, and suitable nuts 9 and 10 are fitted to the ends of the clip, so as to hold the tie plate or bar snugly against the under side of the axle, and thereby rigidly hold the clip in place. The rear side of this clip is thickened and projected above and below the front side, so as to constitute an integral king-bolt, which is terminally screw-threaded at its upper end, as indicated at 12, while the adjacent lower portion of the bolt is smooth and conical or tapered upwardly, as at 13, to form a bearing, as will be hereinafter described. The lower end portion of the bolt is terminally screw-threaded, as at 14, and is intermediately smooth, as at 15, between the terminally-screw-threaded part 14 and the screw-threaded portion for the reception of the nut 10.

Applied to the under side of the bolster is a bolster-plate 16, which may be secured thereto in any suitable manner—as, for instance, by means of the clips 17, which embrace and secure the elliptical springs 18 to the top of the bolster. At the middle of this plate and projected at the rear edge thereof there is an open-ended bearing socket or eye 19, which receives the tapered conical upper portion 13 of the king-bolt, and a nut 20 is fitted to the upper terminal of the bolt.

To the under sides of the reach-bars the rear ends of a forked reach iron or bracket 21 are connected in any suitable manner, and the front end of this iron or bracket is provided with an open-ended socket or eye 22 for the reception of the lower portion 15 of the king-bolt, there being a suitable nut 23 fitted to the lower terminal of the bolt to hold the bracket thereto.

From the foregoing description it will be understood that the king-bolt clip of the present invention is complete in itself, and by reason of the integral formation of the bolt and clip a plurality of separate members is obviated and rattling and looseness of parts is effectually prevented.

Having thus described the invention, what is claimed, and desired to be secured by Letters Patent, is—

1. The combination with an axle, a bolster, a reach connected to the bolster and fifth-wheel bearing members coöperating with the axle and the bolster and reach, of a plate applied to the bolster and provided with a socket, a clip embracing the axle with one side projected above and below the opposite side to form an integral king-bolt, the upper end of the king-bolt being pivotally received within the socket, a tie-bar having openings receiving the lower end portions of the sides of the clip, nuts applied to the sides of the clip to hold the tie-bar against the axle, and a reach-bracket hung from the reach and provided with a socket pivotally receiving the lower end of the king-bolt.

2. As a new article of manufacture, an inverted substantially U-shaped axle-clip having one side projected above and below the opposite side to form an integral king-bolt, the opposite terminals of the bolt portion being screw-threaded, the upper portion of the bolt being smooth and tapered upwardly below and adjacent to the upper terminal screw-threaded portion to form a bearing, and the lower portion of the bolt having screw-threads which are separated from the lower terminally-screw-threaded part by a smooth bearing portion.

HENRY A. LANMAN.

In presence of—
C. C. SHEPHERD,
W. L. MORROW.